US010803889B2

(12) United States Patent
Biskeborn et al.

(10) Patent No.: US 10,803,889 B2
(45) Date of Patent: Oct. 13, 2020

(54) APPARATUS WITH DATA READER SENSORS MORE RECESSED THAN SERVO READER SENSOR

(71) Applicant: International Business Machines Corporation, Armonk, NY (US)

(72) Inventors: Robert G. Biskeborn, Hollister, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/282,062

(22) Filed: Feb. 21, 2019

(65) Prior Publication Data

US 2020/0273487 A1 Aug. 27, 2020

(51) Int. Cl.
*G11B 5/187* (2006.01)
*G11B 5/39* (2006.01)
(Continued)

(52) U.S. Cl.
CPC .......... *G11B 5/187* (2013.01); *G11B 5/00813* (2013.01); *G11B 5/00826* (2013.01); *G11B 5/29* (2013.01); *G11B 5/3909* (2013.01); *G11B 5/3912* (2013.01); *G11B 5/3948* (2013.01); *G11B 5/3977* (2013.01); *G11B 5/4893* (2013.01); *G11B 5/265* (2013.01)

(58) Field of Classification Search
None
See application file for complete search history.

(56) References Cited

U.S. PATENT DOCUMENTS 4,610,935 A 9/1986 Kumasaka et al.
5,668,686 A 9/1997 Shouji et al.
(Continued)

FOREIGN PATENT DOCUMENTS

EP 0911811 A2 4/1999
EP 1471543 A2 10/2004
(Continued)

OTHER PUBLICATIONS

Childress et al., "Magnetic recording read head sensor technology," Science direct, Comptes Rendus Physique, vol. 6, Issue 9, Nov. 2005, pp. 997-1012.
(Continued)

*Primary Examiner* — Craig A. Renner
(74) *Attorney, Agent, or Firm* — Zilka-Kotab, P.C.

(57) ABSTRACT

An apparatus according to one approach includes a servo reader transducer structure on a module. The servo reader transducer structure has a lower shield, an upper shield above the lower shield, the upper and lower shields providing magnetic shielding, a current-perpendicular-to-plane sensor between the upper and lower shields, an electrical lead layer between the sensor and one of the shields, and a spacer layer between the electrical lead layer and the one of the shields. The electrical lead layer is in electrical communication with the sensor. The conductivity of the electrical lead layer is higher than the conductivity of the spacer layer. An array of writers is also present on the module. Writer modules having this structure are less susceptible to shorting, and therefore enable use of TMR servo readers on writer modules.

18 Claims, 12 Drawing Sheets

(51) Int. Cl.
  G11B 5/008 (2006.01)
  G11B 5/29 (2006.01)
  G11B 5/48 (2006.01)
  G11B 5/265 (2006.01)

(56) References Cited

U.S. PATENT DOCUMENTS

| | | | |
|---|---|---|---|
| 5,668,688 A | 9/1997 | Dykes et al. | |
| 5,729,410 A * | 3/1998 | Fontana, Jr. et al. | G11B 5/3909 360/324.2 |
| 5,838,521 A | 11/1998 | Ravipati | |
| 5,862,022 A | 1/1999 | Noguchi et al. | |
| 5,880,910 A | 3/1999 | Shouji et al. | |
| 5,898,547 A | 4/1999 | Fontana, Jr. et al. | |
| 5,898,548 A | 4/1999 | Dill et al. | |
| 5,963,401 A | 10/1999 | Dee et al. | |
| 6,185,080 B1 | 2/2001 | Gill | |
| 6,198,609 B1 | 3/2001 | Barr et al. | |
| 6,209,193 B1 | 4/2001 | Hsiao | |
| 6,292,334 B1 | 9/2001 | Koike et al. | |
| 6,353,518 B2 | 3/2002 | Pinarbasi | |
| 6,425,989 B1 | 7/2002 | Westwood | |
| 6,493,195 B1 * | 12/2002 | Hayashi et al. | G11B 5/3909 360/320 |
| 6,542,340 B1 * | 4/2003 | Hayashi | G11B 5/3909 360/322 |
| 6,580,586 B1 * | 6/2003 | Biskeborn | G11B 5/3912 360/319 |
| 6,680,832 B2 | 1/2004 | Fontana, Jr. et al. | |
| 6,729,014 B2 | 5/2004 | Lin et al. | |
| 6,735,059 B2 | 5/2004 | Sato | |
| 6,760,198 B2 | 7/2004 | Jarratt | |
| 6,762,912 B2 | 7/2004 | Ma | |
| 6,833,979 B1 | 12/2004 | Knapp et al. | |
| 6,847,509 B2 | 1/2005 | Yoshikawa et al. | |
| 6,980,403 B2 | 12/2005 | Hasegawa | |
| 7,031,119 B2 | 4/2006 | Watanabe et al. | |
| 7,057,864 B2 | 6/2006 | Gill | |
| 7,280,321 B2 | 10/2007 | Watanabe et al. | |
| 7,352,539 B2 | 4/2008 | Sato et al. | |
| 7,382,589 B2 | 6/2008 | Lin et al. | |
| 7,551,409 B2 | 6/2009 | Carey et al. | |
| 7,601,610 B2 | 10/2009 | Arena et al. | |
| 7,715,156 B2 | 5/2010 | Hirata et al. | |
| 7,751,154 B2 | 7/2010 | Wu | |
| 7,933,100 B2 | 4/2011 | Nakabayashi et al. | |
| 8,081,398 B2 | 12/2011 | Hachisuka | |
| 8,335,056 B2 | 12/2012 | Balamane et al. | |
| 8,470,463 B2 | 6/2013 | Wessel et al. | |
| 8,514,526 B2 | 8/2013 | Ito et al. | |
| 8,531,801 B1 | 9/2013 | Xiao et al. | |
| 8,576,518 B1 | 11/2013 | Zeltser et al. | |
| 8,638,530 B1 | 1/2014 | Hsu et al. | |
| 8,760,819 B1 | 6/2014 | Liu et al. | |
| 8,780,505 B1 | 7/2014 | Xiao | |
| 8,797,692 B1 | 8/2014 | Guo et al. | |
| 8,804,287 B2 | 8/2014 | Araki et al. | |
| 8,830,635 B2 | 9/2014 | Watanabe et al. | |
| 8,873,204 B1 | 10/2014 | Gao et al. | |
| 8,891,207 B1 | 11/2014 | Li et al. | |
| 8,908,333 B1 | 12/2014 | Rudy et al. | |
| 8,941,954 B2 | 1/2015 | Le et al. | |
| 8,984,739 B2 | 3/2015 | Shimazawa et al. | |
| 9,013,836 B1 | 4/2015 | Liu et al. | |
| 9,111,550 B1 | 8/2015 | Liu et al. | |
| 9,263,068 B1 | 2/2016 | Biskeborn et al. | |
| 9,275,666 B1 | 3/2016 | Vanderheyden et al. | |
| 9,280,991 B1 | 3/2016 | Biskeborn et al. | |
| 9,384,764 B1 | 7/2016 | Biskeborn et al. | |
| 9,406,319 B1 | 8/2016 | Biskeborn et al. | |
| 9,607,635 B1 | 3/2017 | Biskeborn et al. | |
| 9,747,931 B1 * | 8/2017 | Biskeborn et al. | G11B 5/3977 |
| 9,767,830 B2 | 9/2017 | Biskeborn et al. | |
| 9,779,767 B2 | 10/2017 | Biskeborn et al. | |
| 9,892,747 B2 | 2/2018 | Biskeborn et al. | |
| 9,947,348 B1 | 4/2018 | Biskeborn et al. | |
| 9,997,180 B1 | 6/2018 | Biskeborn et al. | |
| 10,014,015 B2 | 7/2018 | Biskeborn et al. | |
| 10,115,417 B2 | 10/2018 | Biskeborn et al. | |
| 2002/0064002 A1 | 5/2002 | Gill | |
| 2002/0154458 A1 | 10/2002 | Lin et al. | |
| 2002/0186514 A1 | 12/2002 | Childress et al. | |
| 2003/0011944 A1 | 1/2003 | Hosomi | |
| 2004/0057162 A1 | 3/2004 | Gill | |
| 2004/0100737 A1 * | 5/2004 | Nakamoto et al. | G11B 5/3912 360/319 |
| 2004/0218313 A1 | 11/2004 | Suda | |
| 2007/0047146 A1 | 3/2007 | Biskeborn et al. | |
| 2007/0109681 A1 * | 5/2007 | Biskeborn et al. | G11B 5/2652 360/119.02 |
| 2007/0195467 A1 | 8/2007 | Gill | |
| 2007/0230062 A1 | 10/2007 | Maejima et al. | |
| 2008/0117553 A1 | 5/2008 | Carey et al. | |
| 2008/0151438 A1 | 6/2008 | Tanaka et al. | |
| 2008/0170335 A1 | 7/2008 | Iben et al. | |
| 2009/0040661 A1 | 2/2009 | Tanaka et al. | |
| 2009/0273857 A1 | 11/2009 | Iben et al. | |
| 2010/0103563 A1 | 4/2010 | Machita et al. | |
| 2011/0019313 A1 | 1/2011 | Brown et al. | |
| 2011/0026168 A1 | 2/2011 | Carey et al. | |
| 2011/0051291 A1 | 3/2011 | Miyauchi et al. | |
| 2011/0069417 A1 | 3/2011 | Kawamori et al. | |
| 2011/0085261 A1 | 4/2011 | Ito et al. | |
| 2012/0050919 A1 | 3/2012 | Brown et al. | |
| 2012/0063034 A1 | 3/2012 | Hsu et al. | |
| 2012/0281319 A1 | 11/2012 | Singleton et al. | |
| 2014/0022668 A1 | 1/2014 | Takagishi et al. | |
| 2014/0063645 A1 * | 3/2014 | Biskeborn et al. | G11B 5/29 360/231 |
| 2015/0138673 A1 | 5/2015 | Adrong et al. | |
| 2015/0248903 A1 | 9/2015 | Aoyama et al. | |
| 2016/0133282 A1 | 5/2016 | Biskeborn et al. | |
| 2016/0379674 A1 | 12/2016 | Biskeborn et al. | |
| 2016/0379675 A1 | 12/2016 | Biskeborn et al. | |
| 2017/0025148 A1 | 1/2017 | Boyd | |
| 2017/0309302 A1 | 10/2017 | Biskeborn et al. | |
| 2018/0068682 A1 | 3/2018 | Biskeborn et al. | |
| 2018/0277148 A1 | 9/2018 | Biskeborn et al. | |

FOREIGN PATENT DOCUMENTS

| | | |
|---|---|---|
| EP | 2320489 B1 | 5/2014 |
| JP | 2006134388 A | 5/2006 |

OTHER PUBLICATIONS

Biskeborn et al., U.S. Appl. No. 15/466,540, filed Mar. 22, 2017.
Biskeborn et al., U.S. Appl. No. 15/963,022, filed Apr. 25, 2018.
Kim et al., "Characterization of an AlOx Tunneling Barrier in a Magnetic Tunnel Junction by a Surface Plasmon Resonance Spectroscopy Technique," IEEE Transactions on Magnetics, vol. 45, No. 1, Jan. 2009, pp. 60-63.
Biskeborn et al., U.S. Appl. No. 15/136,759, filed Apr. 22, 2016.
Biskeborn et al., U.S. Appl. No. 15/422,322, filed Feb. 1, 2017.
Biskeborn et al., U.S. Appl. No. 15/812,871, filed Nov. 14, 2017.

* cited by examiner

APPARATUS WITH DATA READER SENSORS MORE RECESSED THAN SERVO READER SENSOR

BACKGROUND

The present invention relates to data storage systems, and more particularly, this invention relates to magnetic heads, e.g., magnetic tape heads, which include current-perpendicular-to-plane (CPP) servo sensors having hard spacers incorporated therewith.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

Tunneling magnetoresistive (TMR) servo readers are susceptible to scratching caused by contact with asperities fixed on moving magnetic medium surfaces. Friction between asperities on the tape and the ductile metallic films in the sensor gives rise to deformation forces in the direction of tape motion. As a result, an electrical short is often created by the scratching and/or smearing of conductive material across the layers, which has a net effect of creating bridges of conductive material across the sensor. Particularly, particles protruding from the medium tend to plow through ductile magnetic material, e.g., from one or both shields, smearing the metal across the insulating material of the sensor, and thereby creating an electrical short that reduces the effective resistance of the sensor and diminishes the sensitivity of the sensor as a whole. Deep scratches may result in electrical shorting due to abrasive lapping particles that scratch or smear conductive material across the insulating materials separating the conductive leads, e.g., opposing shields, which allow sense (bias) current to flow through the sensor and magnetic head as a whole. The scratches may result in a loss of amplitude and track following ability. When electrical shorting occurs in a servo reader of the writing module, the head containing the writing module may become non-functional for writing operations in at least one tape motion direction, and possibly in both directions.

Susceptibility to scratching and problems arising from scratching in conventional TMR servo reader sensors has precluded adoption of TMR servo reader sensors in writing modules. Giant magnetoresistive (GMR) servo readers are conventionally used in writing modules. Problematically, GMR servo readers must be wider than TMR servo readers to have adequate output. Wide GMR sensors are not able to resolve track position as well as narrower TMR sensors. GMR sensors have lower sensitivity than TMR sensors. Further, GMR sensors may exhibit non-uniform and/or unstable magnetic response across the width of the track leading to relatively less precise positioning of tracks on tape and limiting how densely tracks may be shingled. The use of GMR sensors limits tracks per inch (TPI) growth.

GMR sensors are also susceptible to degradation and declining output with usage due to changes (e.g., due to interdiffusion) in the sensitive, thin copper spacer layer and/or to changes in crystal structure of the antiferromagnetic (AFM) layer in the GMR stack.

SUMMARY

An apparatus according to one approach includes a servo reader transducer structure on a module. The servo reader transducer structure has a lower shield, an upper shield above the lower shield, the upper and lower shields providing magnetic shielding, a current-perpendicular-to-plane sensor between the upper and lower shields, an electrical lead layer between the sensor and one of the shields, and a spacer layer between the electrical lead layer and the one of the shields. The electrical lead layer is in electrical communication with the sensor. The conductivity of the electrical lead layer is higher than the conductivity of the spacer layer. An array of writers is also present on the module. Writer modules having this structure are less susceptible to shorting, and therefore enable use of TMR servo readers on writer modules.

Such structures are especially beneficial when the sensor is a tunneling magnetoresistive servo sensor.

In some approaches, an electrical lead layer and spacer layer are present between the sensor and each shield, thereby enhancing reliability by providing protection against shorting for bi-directional tape operation.

The aforementioned enhanced reliability also enables minimal recession of the current-perpendicular-to-plane sensor from the plane of the media facing surface of the module, and consequently less spacing loss when reading servo tracks. For example, the recession of the current-perpendicular-to-plane sensor from the plane is about 5 nm or less in some approaches.

Any of these approaches and embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several configurations of magnetic storage systems having one or more modules which implement write transducers and TMR servo readers. The servo readers disclosed herein are tunnel valve transducers, and in some approaches having wider read gaps than would be found on a TMR data reader configured for compatibility with the same tape format as the servo readers are configured for. In an exemplary approach, the TMR servo readers comprise thick layers of alumina and iridium spacing layers between the sensor and the shields, though other materials are also disclosed herein. Thus, various approaches described herein may reduce the probability of sensor shorting for CPP sensors, e.g., such as TMR servo reader sensors, giant magnetoresistive (GMR) servo reader sensors, etc., as will be described in further detail below.

In one general approach, an apparatus includes a servo reader transducer structure on a module. The servo reader transducer structure has a lower shield, an upper shield above the lower shield, the upper and lower shields providing magnetic shielding, a current-perpendicular-to-plane sensor between the upper and lower shields, an electrical lead layer between the sensor and one of the shields, and a spacer layer between the electrical lead layer and the one of the shields. The electrical lead layer is in electrical communication with the sensor. The conductivity of the electrical lead layer is higher than the conductivity of the spacer layer. An array of writers is also present on the module. Writer modules having this structure are less susceptible to shorting, and therefore enable use of TMR servo readers on writer modules.

Figure 1A:
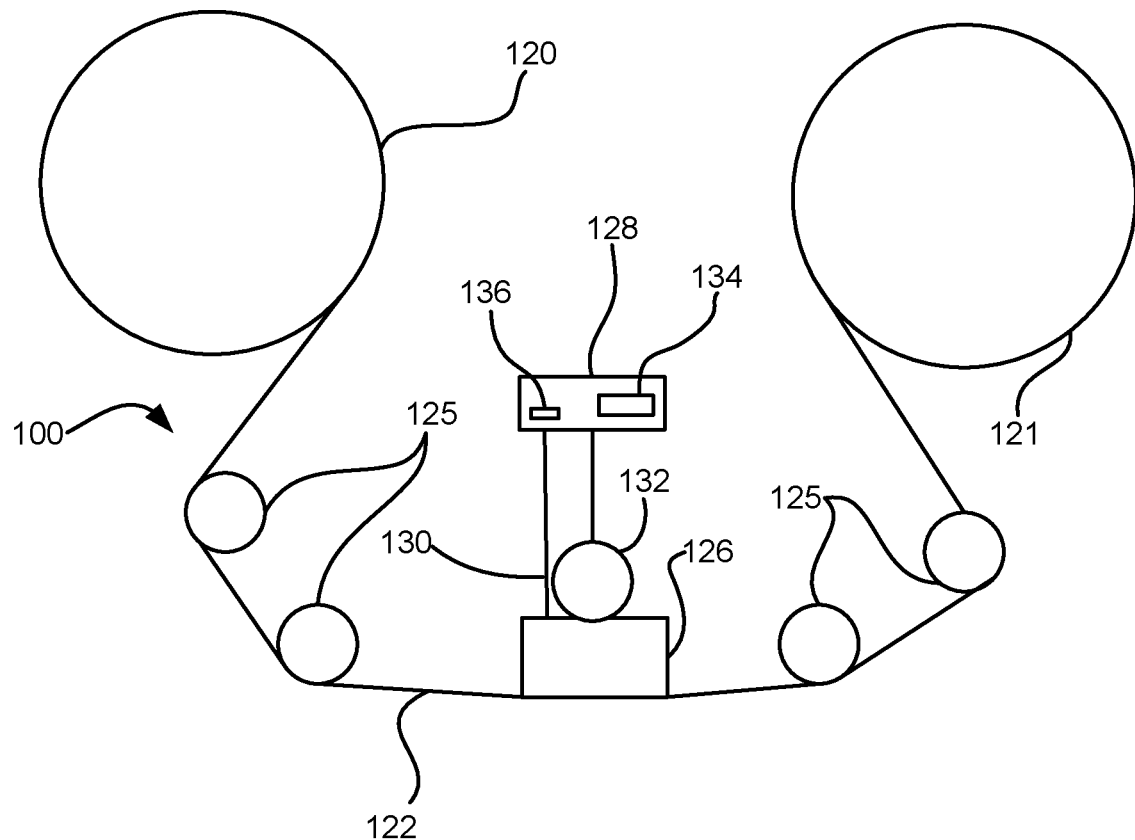
FIG. 1A is a schematic diagram of a simplified tape drive system according to one approach.

FIG. 1A illustrates a simplified tape drive 100 of a tape-based data storage system, which may be employed in the context of the present invention. While one specific implementation of a tape drive is shown in FIG. 1A, it should be noted that the approaches described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
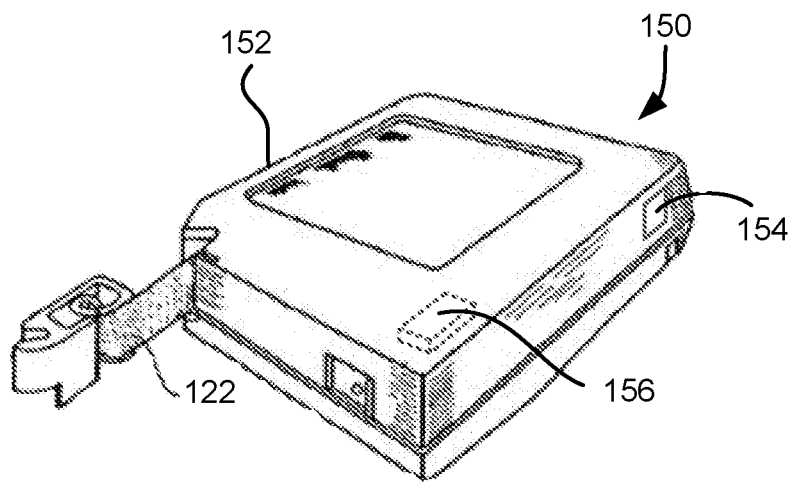
FIG. 1B is a schematic diagram of a tape cartridge according to one approach.

FIG. 1B illustrates an exemplary tape cartridge 150 according to one approach. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred approach, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
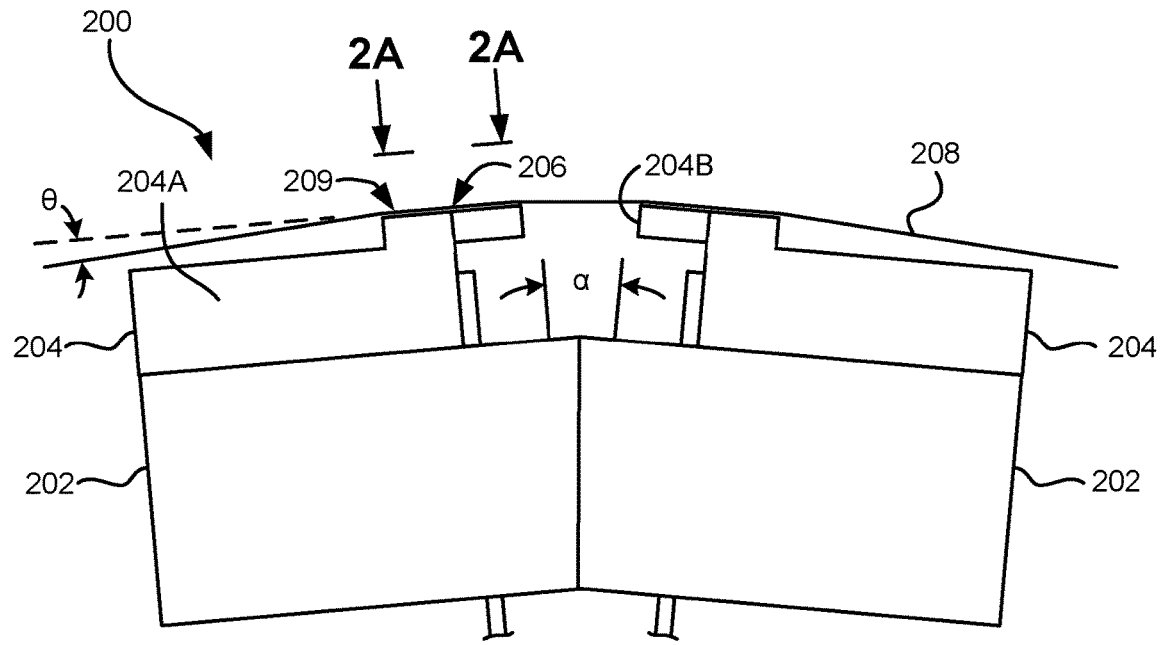
FIG. 2 illustrates a side view of a flat-lapped, bi-directional, two-module magnetic tape head according to one approach.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), where the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
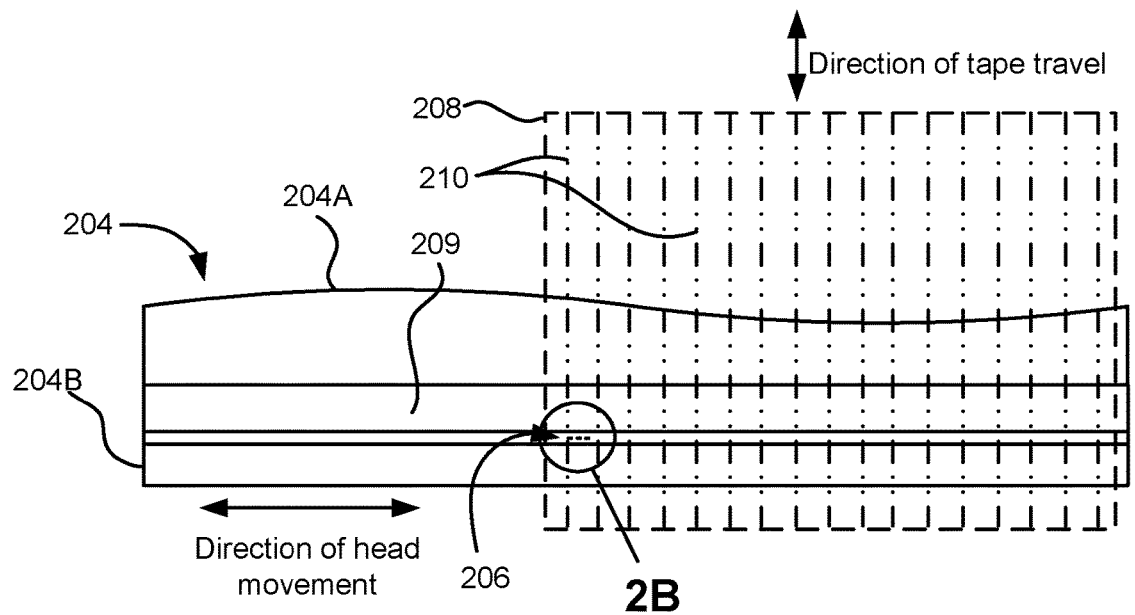
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
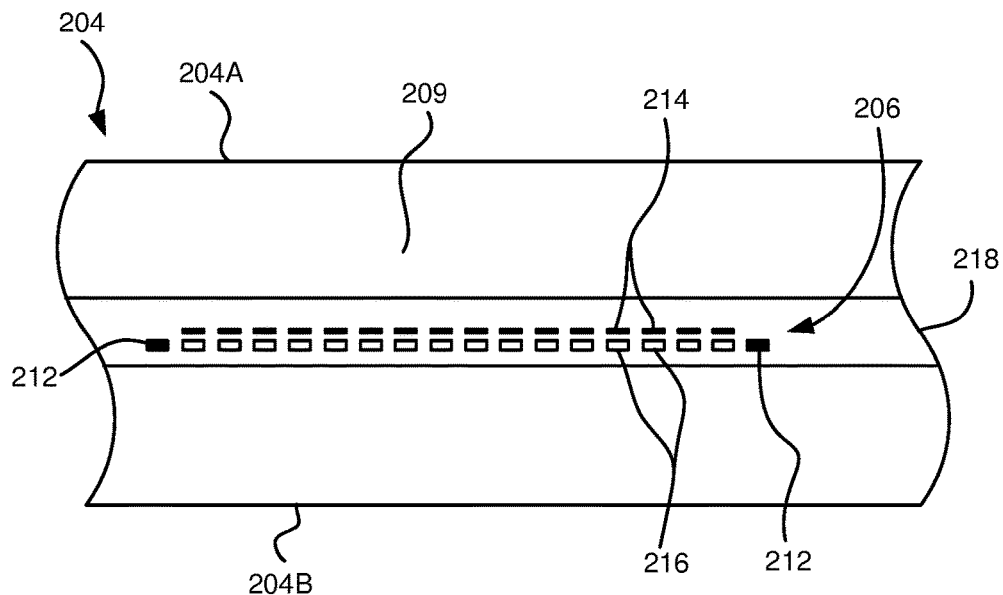
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative configurations include 8, 16, 32, 40, and 64 active readers and/or writers 206 per array, and alternatively interleaved designs having odd numbers of reader or writers such as 17, 25, 33, etc. An illustrative configuration includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
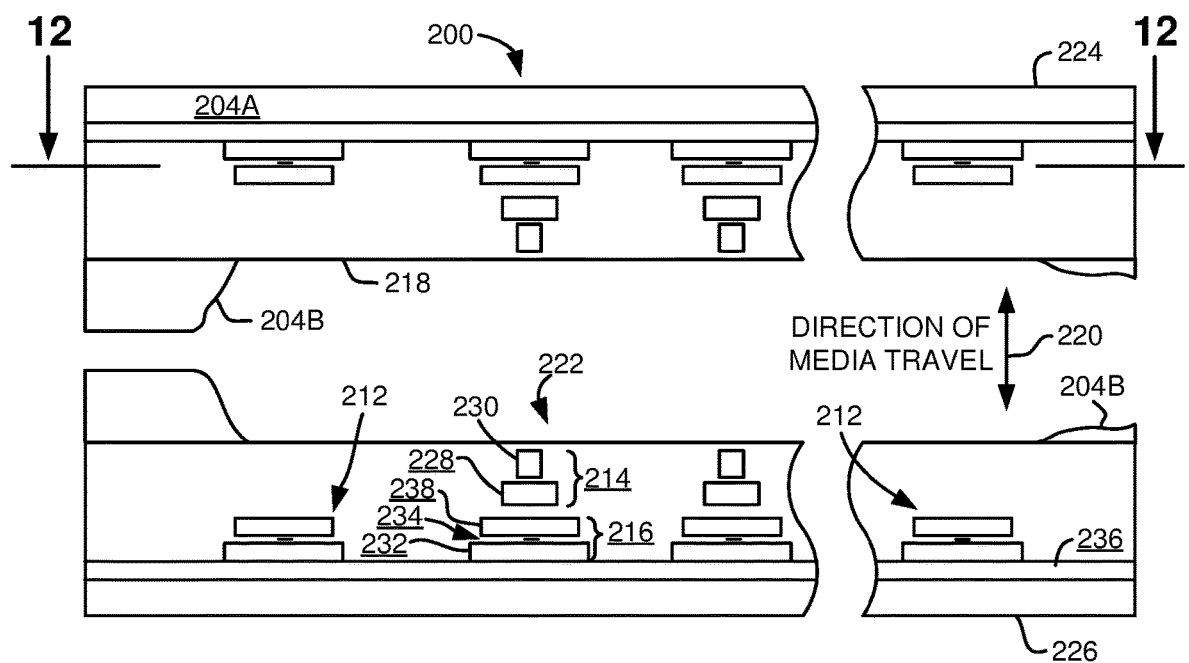
FIG. 2C is a detailed view of a partial tape bearing surface of a pair of modules.

FIG. 2C shows a partial tape bearing surface view of complimentary modules of a magnetic tape head 200 according to one approach. In this approach, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetoresistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type of CPP sensor, including those based on MR, GMR, TMR, etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
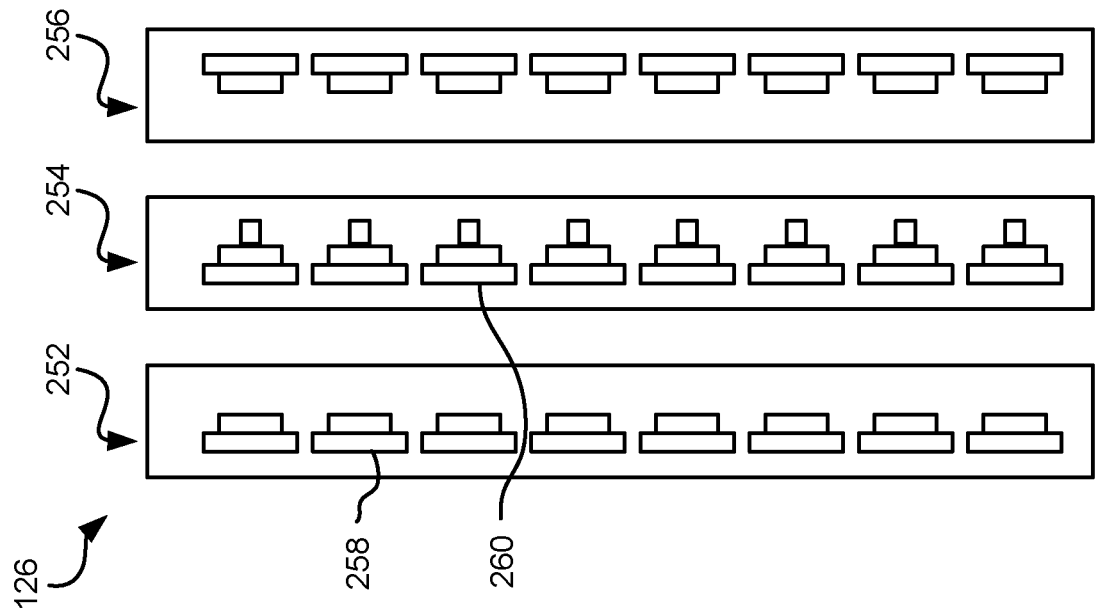
FIG. 4 is a partial tape bearing surface view of a magnetic head having a read-write-read configuration.
Figure 3:
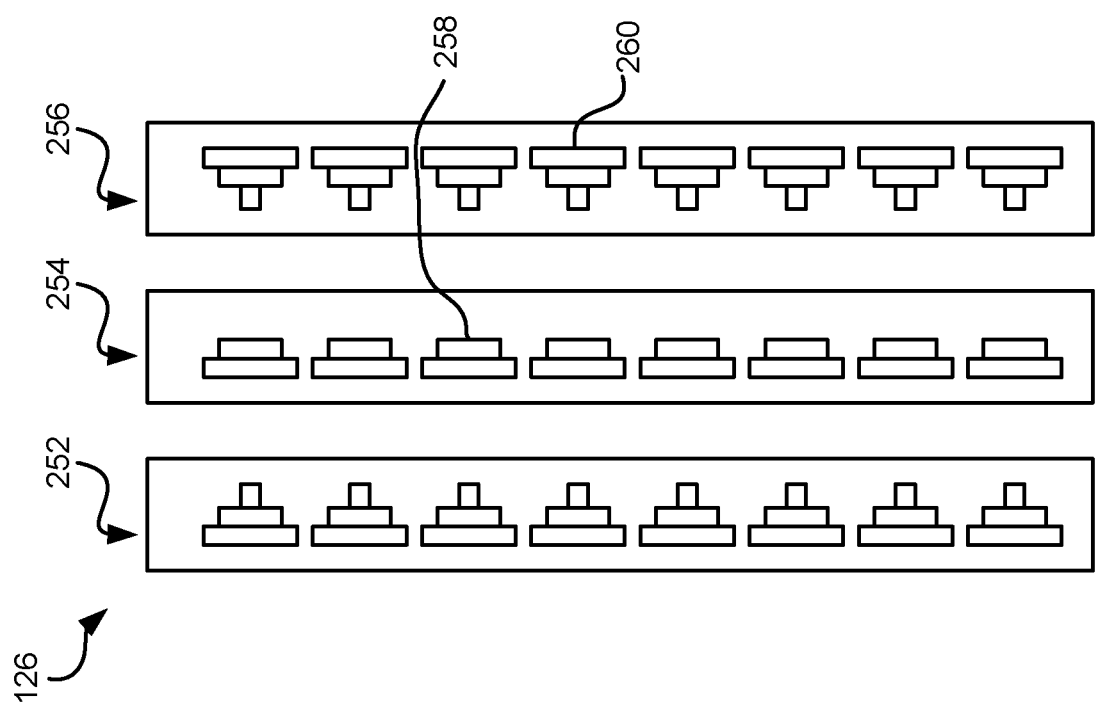
FIG. 3 is a partial tape bearing surface view of a magnetic head having a write-read-write configuration.

The configuration of the tape head 126 according to one approach includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify approaches (aspects) of the present invention. One skilled in the art apprised with the teachings herein will appreciate how permutations of the present invention would apply to configurations other than a W-R-W configuration.

Figure 5:
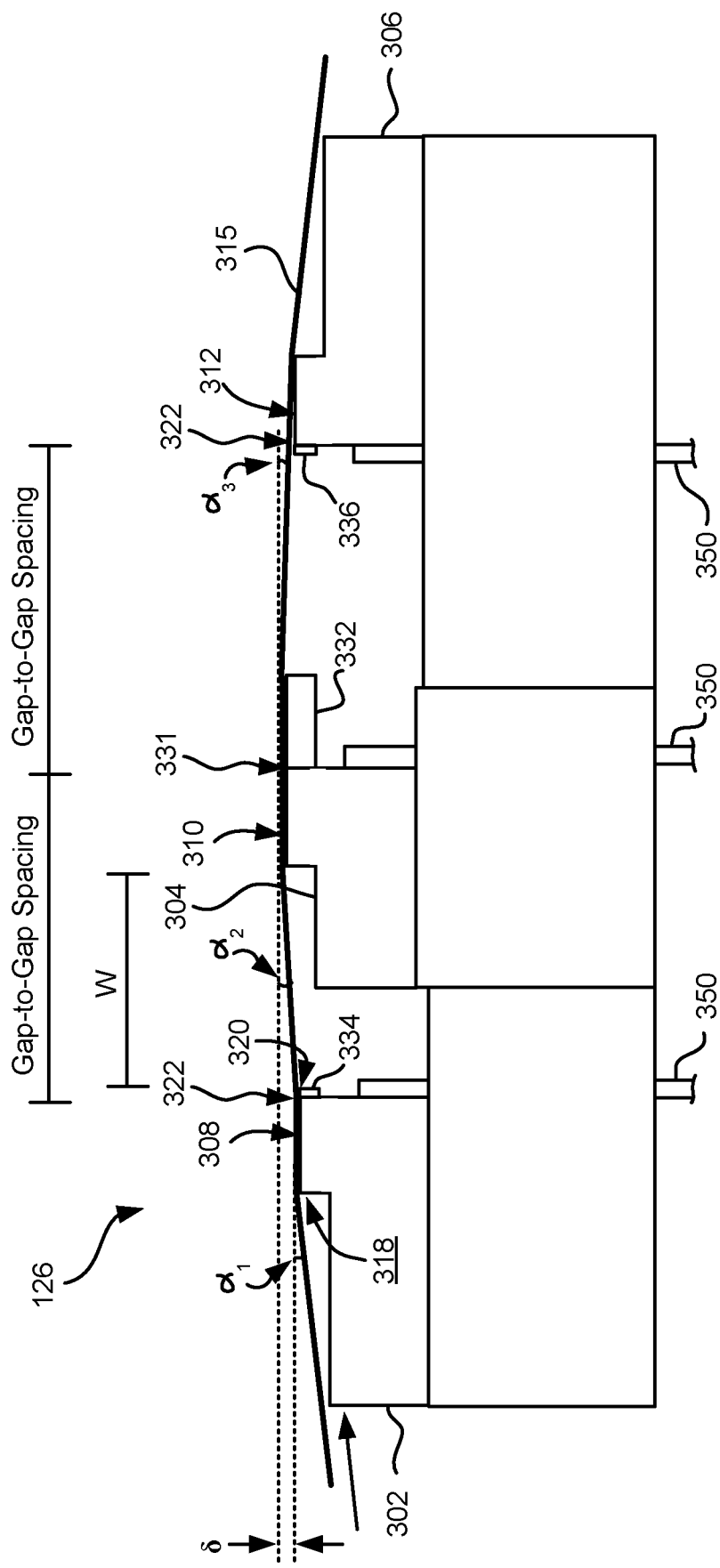
FIG. 5 is a side view of a magnetic tape head with three modules according to one approach where the modules all generally lie along about parallel planes.

FIG. 5 illustrates a magnetic head 126 according to one approach of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
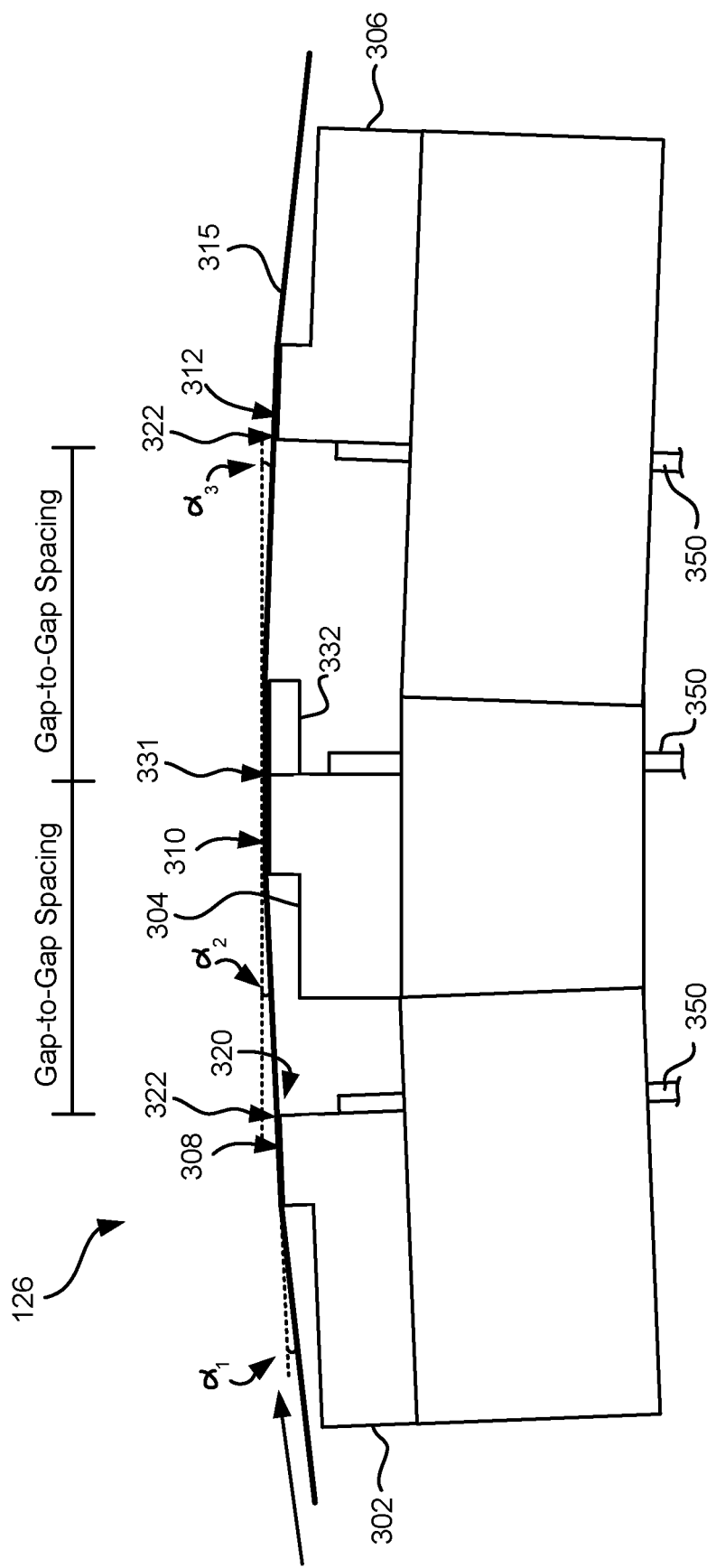
FIG. 6 is a side view of a magnetic tape head with three modules in a tangent (angled) configuration.

In one approach, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These approaches are particularly adapted for write-read-write applications.

A benefit of this and other approaches described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller as tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one approach, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some approaches, the second module 304 has a closure, while the first and third modules 302, 306 do not have a closure. Where there is no closure, preferably a hard coating is added to the module. One preferred coating is diamond-like carbon (DLC).

In the configuration shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used Linear Tape Open (LTO) tape head spacing. The open space between the modules 302, 304, 306 can still be set to approximately 0.5 to 0.6 mm, which in some configurations is ideal for stabilizing tape motion over the second module 304.

Depending on tape tension and stiffness, it may be desirable to angle the tape bearing surfaces of the outer modules relative to the tape bearing surface of the second module. FIG. 6 illustrates an approach where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this approach, thereby reducing wear on the elements in the trailing module 306. These approaches are particularly useful for write-read-write applications. Additional aspects of these approaches are similar to those given above.

Typically, the tape wrap angles may be set about midway between the approaches shown in FIGS. 5 and 6.

Figure 7:
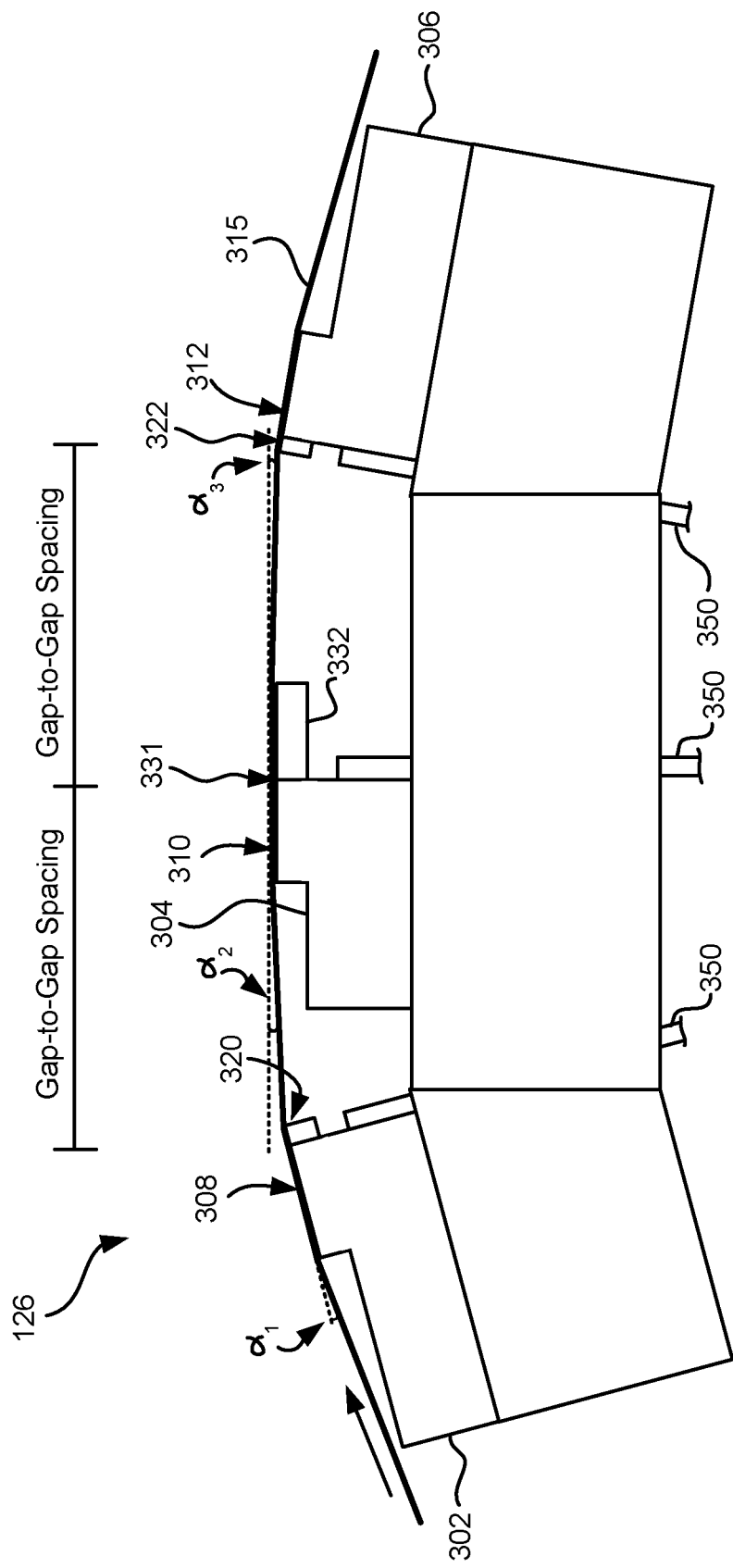
FIG. 7 is a side view of a magnetic tape head with three modules in an overwrap configuration.

FIG. 7 illustrates an approach where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this approach, the tape does not pop off of the trailing module, allowing it to be used for writing or reading. Accordingly, the leading and middle modules can both perform reading and/or writing functions while the trailing module can read any just-written data. Thus, these approaches are preferred for write-read-write, read-write-read, and write-write-read applications. In the latter approaches, closures should be wider than the tape canopies for ensuring read capability. The wider closures may require a wider gap-to-gap separation. Therefore, a preferred approach has a write-read-write configuration, which may use shortened closures that thus allow closer gap-to-gap separation.

Additional aspects of the approaches shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the approaches described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. With continued reference to the above described apparatuses, it would be advantageous for tape recording heads to include CPP MR sensor technology, e.g., such as TMR and GMR. Furthermore, with the continued reduction of data track widths in magnetic storage technologies, CPP MR sensors enable readback of data in ultra-thin data tracks due to their high level of sensitivity in such small operating environments.

As will be appreciated by one skilled in the art, by way of example, TMR is a magnetoresistive effect that occurs with a magnetic tunnel junction. TMR sensors typically include two ferromagnetic layers separated by a thin insulating barrier layer. If the barrier layer is thin enough e.g., less than about 15 angstroms, electrons can tunnel from one ferromagnetic layer to the other ferromagnetic layer, passing through the insulating material and thereby creating a current. Variations in the current, caused by the influence of external magnetic fields from a magnetic medium on the free ferromagnetic layer of the TMR sensor, correspond to data stored on the magnetic medium.

It is well known that TMR and other CPP MR sensors are particularly susceptible to shorting during fabrication due to abrasive lapping particles that scratch or smear conductive material across the insulating materials separating the conductive leads, e.g., opposing shields, which allow sense (bias) current to flow through the sensor and magnetic head as a whole. Friction between asperities on the tape and the ductile metallic films in the sensor gives rise to deformation forces in the direction of tape motion. As a result, an electrical short is created by the scratching and/or smearing across the layers which has a net effect of creating bridges of conductive material across the sensor. Particularly, the lapping particles tend to plow through ductile magnetic material, e.g., from one or both shields, smearing the metal across the insulating material, and thereby creating an electrical short that reduces the effective resistance of the sensor and diminishes the sensitivity of the sensor as a whole.

Scientists and engineers familiar with tape recording technology would not expect a CPP MR sensor to remain operable (e.g., by not experiencing shorting) in a contact recording environment such as tape data storage, because of the near certain probability that abrasive asperities embedded in the recording medium will scrape across the thin insulating layer during tape travel, thereby creating the aforementioned shorting.

Typical CPP MR sensors such as TMR sensors in hard disk drive applications are configured to be in electrical contact with the top and bottom shields of read head structures. In such configurations the current flow is constrained to traveling between the top shield and the bottom shield through the sensor, by an insulator layer with a thickness of about 3 to about 100 nanometers (nm). This insulator layer extends below the hard bias magnet layer to insulate the bottom of the hard bias magnet from the bottom shield/lead layers, and isolates the edges of the sensor from the hard bias magnet material. In a tape environment, where the sensor is in contact with the tape media, smearing of the top or bottom shield material can bridge the insulation layer separating the hard bias magnet from the bottom lead and lower shield, thereby shorting the sensor. Further, shield deformation or smearing can create a conductive bridge across a tunnel barrier layer in a TMR sensor. Such tunnel barrier layer may be only 12 angstroms wide or less.

In disk drives, conventional CPP MR designs are acceptable because there is minimal contact between the head and the media. However, for tape recording, the head and the media are in constant contact. Head coating has been cited as a possible solution to these shorting issues; however, tape particles and asperities have been known to scratch through and/or wear away these coating materials as well. Furthermore, conventional magnetic recording head coatings are not available for protecting against defects during lapping processes, as the coating is applied after these process steps. Because the insulating layers of a conventional CPP MR servo reader sensor are significantly thin, the propensity for electrical shorting due, e.g., to scratches, material deposits, surface defects, films deformation, etc., is high. Approaches described herein implement novel spacer layers in combination with TMR servo reader transducer sensors. As a result, some of the approaches described herein may be able to reduce the probability of, or even prevent, shorting in the most common areas where shorting has been observed, e.g. the relatively larger areas on opposite sides of the sensor between the shields.

The potential use of CPP MR servo reader sensors in tape heads has heretofore been thought to be highly undesirable, as tape heads include multiple sensors, e.g., 16, 32, 64, etc., on a single die. Thus, if one or more of those sensors become inoperable due to the aforementioned shorting, the entire head becomes defective and typically would need to be discarded and/or replaced for proper operation of the apparatus.

Conventional current in-plane type sensors require at least two shorting events across different parts of the sensor in order to affect the sensor output, and therefore such heads are far less susceptible to shorting due to scratches. In contrast, tape heads with CPP MR servo reader sensors may short with a single event, which is another reason that CPP MR servo reader sensors have not been adopted into contact recording systems.

Scientists and engineers familiar with tape recording technology would not expect a TMR servo reader sensor to remain operable (e.g., by not experiencing shorting) in a writer module with an array of write transducers, especially where both TMR servo reader sensors in a pair must remain operable in order to protect writing operations.

Various approaches described herein comprise a writing module having scratch resilient TMR servo readers. The writing module comprises zero or near zero spacing write transducers (also referred to herein as "writers"), where the spacing of the write transducers is into or out of the tape bearing surface relative to an imaginary plane extending across the media facing surface of the substrate thereunder. In some approaches, the TMR servo readers are slightly prerecessed from the plane.

Various approaches include top and/or bottom shields electrically isolated from a CPP MR servo reader sensor, thereby improving the previously experienced issue of shield-to-sensor or shield-to-shield shorting which caused diminished sensor accuracy and/or total inoperability. Some of the approaches described herein include spacer layers as gap liners which are preferably in close proximity to the sensing structure, thereby resisting deformation and thereby the previously experienced shorting as well, as will be described in further detail below.

Furthermore, various approaches described herein include TMR servo readers having a wide read gap comprising thick layers of alumina and iridium spacing layers between the sensors and shields. Servo readers are not constrained by the same processing requirements as data readers, and a wider read gap may be achieved for resisting electrical shorting due to scratches.

Figure 8:
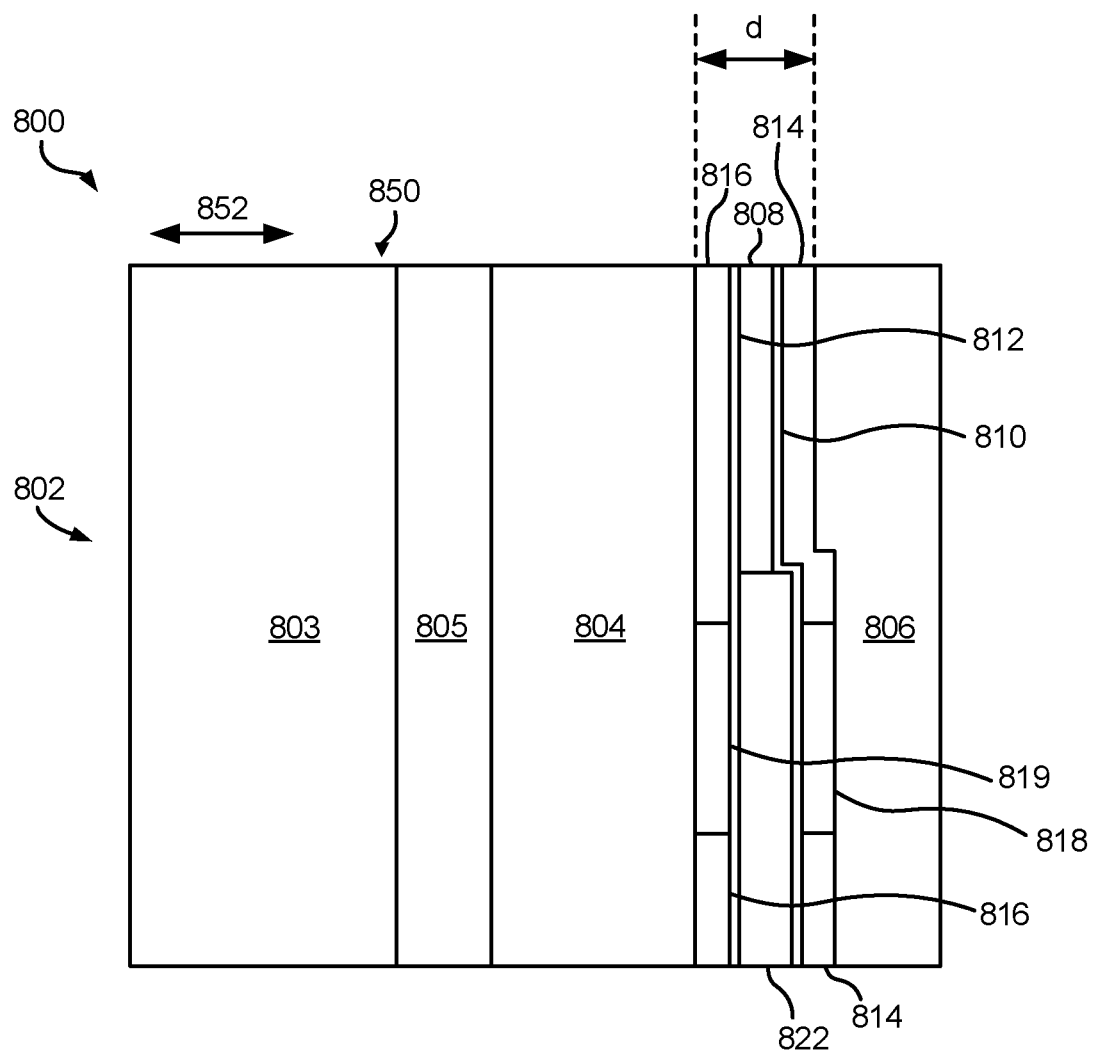
FIG. 8 is a partial cross-sectional view of a servo reader transducer structure according to one approach.

FIG. 8 depicts an apparatus 800, in accordance with one approach. As an option, the present apparatus 800 may be implemented in conjunction with features from any other approach listed herein, such as those described with reference to the other FIGS. However, such apparatus 800 and others presented herein may be used in various applications and/or in permutations which may or may not be specifically described in the illustrative approaches listed herein. Further, the apparatus 800 presented herein may be used in any desired environment. Thus FIG. 8 (and the other FIGS.) may be deemed to include any possible permutation.

Looking to FIG. 8, apparatus 800 includes a servo reader transducer structure 802. The servo reader transducer structure 802 may include a lower shield 804 above a wafer 803 and optional undercoat 805. Moreover, the servo reader transducer structure 802 may include an upper shield 806 positioned above the lower shield 804 (e.g., in a deposition direction thereof).

A CPP servo sensor 808 (e.g. such as a TMR sensor, GMR sensor, etc.) is positioned between the upper and lower shields 806, 804. In a preferred configuration, the CPP sensor 808 is a tunneling magnetoresistive servo sensor. As would be appreciated by one skilled in the art upon reading the present descriptions, according to preferred approaches, the upper and lower shields 806, 804 provide magnetic shielding for the CPP sensor 808. Thus, according to various approaches, one or both of the upper and lower shields 806, 804 may desirably include a magnetic material of a type known in the art. It should be noted that in such approaches, the material of the upper and lower shields 806, 804 may vary, or alternatively be the same.

FIG. 8 further includes an upper electrical lead layer 810 positioned between the sensor 808 and the upper shield 806 (e.g., the shield closest thereto). Moreover, a lower electrical lead layer 812 is included between the sensor and the lower shield 804 (e.g., the shield closest thereto). The upper and lower electrical lead layers 810, 812 are preferably in electrical communication with the sensor 808, e.g., to enable an electrical current to pass through the sensor 808. In one approach, an electrical lead layer 810 or 812 may be positioned between the sensor and one of the shields, and the electrical lead layer is in electrical communication with the sensor. A seed layer for the electrical lead layer(s) may be present. Preferably, the seed layer comprising chromium, e.g., elemental chromium, a chromium-containing alloy, etc. Illustrative deposition thicknesses for each lead layer, including the seed layer, is in a range of about 10 nm to about 75 nm, but could be higher or lower.

Upper and lower spacer layers 814, 816 are also included in the servo reader transducer structure 802. The spacer layers 814, 816 are dielectric in some approaches, but may be electrically conductive in other approaches. The spacer layers 814, 816 preferably have a very low ductility, e.g., have a high resistance to bending and deformation in general, and ideally a lower ductility than refractory metals such as Ir, Ta, and Ti. Upper spacer layer 814 is positioned such that it is sandwiched between the upper electrical lead layer 810 and the upper shield 806 (e.g., the shield closest thereto). Similarly, the lower spacer layer 816 is positioned between the lower electrical lead layer 812 and the lower shield 804 (e.g., the shield closest thereto).

In one approach, the thickness of each spacer layer 814, 816 is in the range from about 100 nm to about 150 nm. Experimentation has shown that servo reader transducer structures having relatively thicker spacer layers 814, 816 (e.g., from about 100 nm to about 150 nm) show improved resilience to shorting and improved amplitude in the head.

Although it is preferred that a spacer layer is included on either side of the sensor 808 along the intended direction of tape travel 852, some approaches may only include one spacer layer positioned between one of the leads and the shield closest thereto, such that at least one of the leads, and preferably both leads, are electrically isolated from the shield closest thereto at the tape bearing surface.

As described above, it is not uncommon for tape asperities passing over the sensor to smear the material of an upper or lower shield onto the opposite shield, thereby potentially shorting the sensor. Upper and lower spacer layers 814, 816 reduce the probability of a smear occurring in the sensor region. Moreover, because the upper and lower electrical lead layers 810, 812 are separated from the upper and lower shields 806, 804 at the tape bearing surface by the upper and lower spacer layers 814, 816 respectively, the probability of a smear bridging the upper and lower electrical lead layers 810, 812 is minimized.

Thus, as illustrated in FIG. 8, it is preferred that the spacer layers 814, 816 are positioned at the media facing surface 850 of the servo reader transducer structure 802, e.g., such that the sensor 808 and/or electrical lead layers 810, 812 are separated from the upper and lower shields 806, 804, thereby reducing the chance of a shorting event occurring. Moreover, it is preferred that the material composition of the spacer layers 814, 816 is sufficiently resistant to smearing and/or plowing of conductive material across the sensor 808. Thus, the spacer layers 814, 816 are preferably hard, e.g., at least hard enough to prevent asperities in the tape passing over the servo reader transducer structure 802 from causing deformations in the media facing surface 850 of the servo reader transducer structure 802 which effect the performance of the sensor 808. In preferred approaches, the spacer layers 814, 816 include aluminum oxide. However, according to various approaches, the spacer layers 814, 816 may include at least one of the following materials: ruthenium, ruthenium oxide, aluminum oxide, chrome oxide, silicon nitride, boron nitride, silicon carbide, silicon oxide, titanium oxide, titanium nitride, ceramics, etc., and/or combinations thereof. In some approaches, the spacer layers 814, 816 may be the same. In other approaches, the spacer layers 814, 816 may be different. Illustrative deposition thicknesses of each of the spacer layers, or sub-layers thereof, may be from about 100 nm to about 150 nm.

Furthermore, in various approaches, the electrical lead layers 810, 812 may include any suitable conductive material, e.g., which may include Ir, Cu, Ru, Pt, NiCr, Au, Ag, Ta, Cr, etc.; a sandwiched structure of Ta (e.g. Ta/X/Ta); conductive hard alloys such as titanium nitride, boron nitride, silicon carbide, and the like. In a preferred approach, one or both of the electrical lead layers 810, 812 comprise iridium.

In some approaches, the electrical lead layers 810, 812 be the same. In other approaches, the electrical lead layers 810, 812 may be different.

Previously, magnetic heads having aluminum oxide implemented at the recording gap (even amorphous aluminum oxide) were found to have an undesirably low resistance to wear resulting from use, e.g., having a magnetic tape run over the recording gap. Thus, the inventors did not expect servo reader transducer structures 802 having aluminum oxide spacer layers 814, 816 to exhibit good performance in terms of resisting smearing and/or plowing caused by tape being run thereover. This idea was further strengthened in view of the lack of materials and/or layers present to promote the growth of crystalline aluminum oxide, the growth of which was thereby not supported. However, in sharp contrast to what was expected, the inventors discovered that implementing aluminum oxide spacer layers 814, 816 effectively resisted deformation caused by the magnetic tape. Moreover, experimental results achieved by the inventors support this surprising result, which is contrary to conventional wisdom.

Without wishing to be bound by any theory, it is believed that the improved performance experienced by implementing aluminum oxide spacer layers 814, 816 may be due to low ductility of alumina, relatively high hardness, and low friction resulting between the aluminum oxide spacer layers and defects (e.g., asperities) on a magnetic tape being passed thereover. This is particularly apparent when compared to the higher resistance experienced when metal films and/or coating films are implemented. Specifically, coatings may not be effective in preventing shorting because underlying films (e.g., such as permalloy) are still susceptible to indentation, smearing, plowing, deformation, etc.

Thus, in an exemplary approach, the upper and/or lower spacer layers may include an aluminum oxide which is preferably amorphous. Moreover, an amorphous aluminum oxide spacer layer may be formed using sputtering, atomic layer deposition, etc., or other processes which would be appreciated by one skilled in the art upon reading the present description. According to another exemplary approach, the upper and/or lower spacer layers may include an at least partially polycrystalline aluminum oxide.

A distance between the upper and lower shields 806, 804 along the tape bearing surface is denoted by a distance d. In a preferred approach, the distance between the upper and lower shields 806, 804 along the tape bearing surface is at least 300 nm. In more approaches, the distance between the upper and lower shields 806, 804 is in a range of about 300 nm to about 500 nm. This range is contrasted to data readers in the same drive, which preferably have a shield-to-shield distance lower than this range to provide high resolution.

In a preferred approach, the shield-to-shield spacing provides a wide gap for increased immunity to shorting caused by smearing. A wider gap results in higher amplitudes due to the relatively lower frequency of servo readers compared to the frequency of a data signal. Experimentation shows that a wide gap in the preferred range (e.g., about 300 nm to about 500 nm) results in improved servo pattern detection. This improvement is especially significant for chevron pattern angles of 15 degrees or greater. Wider gaps also enable locating the sensors closer to the tape due to the increased scratch shorting resistance. Lower head tape spacing improves the writing quality.

Although upper and lower spacer layers 814, 816 separate upper and lower electrical lead layers 810, 812 from the upper and lower shields 806, 804, respectively, at the media facing surface 850 of the servo reader transducer structure 802, the upper and/or lower electrical lead layers 810, 812 are preferably still in electrical communication with the shield closest thereto.

The module (not shown) having the servo reader transducer structure 802 may include an array of writers thereon. The writers may be configured and/or arranged according to descriptions of writers described elsewhere herein and/or in other FIGS. The writers may comprise write poles as discussed in other approaches including FIG. 2. In one approach, the write poles of the writers are not recessed from a plane of the media facing surface 850 of the module. The tape bearing surface 850 of the module generally extends along the media facing side of the substrate and the closure. The current-perpendicular-to-plane servo sensor 808 is recessed from the plane of the media facing surface 850 of the module in some configurations. For example, where the servo sensor transducer structure is on a common module with an array of writers, a recession of the servo sensor 808 from the plane of the media facing surface 850 of the module is about 5 nm or less.

Figure 12:
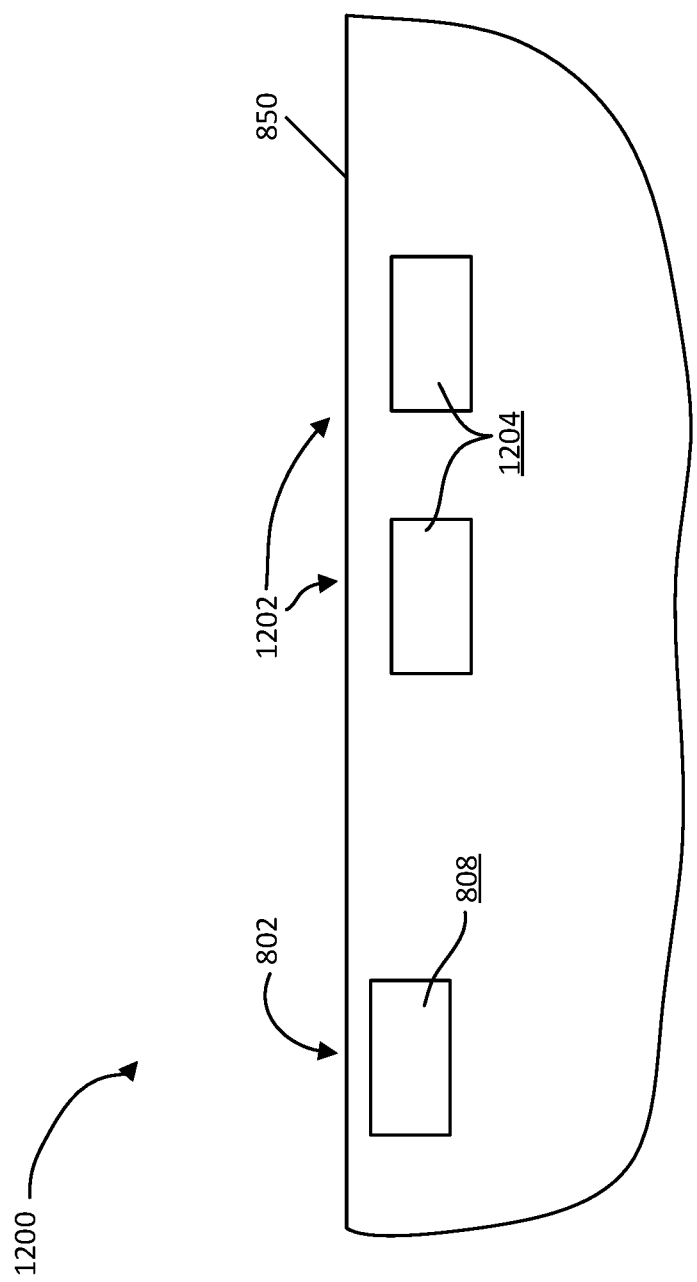
FIG. 12 is a partial cross-sectional view of a servo reader transducer structure and an array of data readers taken along Line 12-12 of FIG. 2C.

In another approach, depicted in FIG. 12, the module 1200 having the servo reader transducer structure 802 may include an array of data readers 1202 thereon. The data readers may be configured and/or arranged according to descriptions of writers described elsewhere herein and/or in other FIGS. In this and other approaches, the servo sensors 808 may have zero or slight recession from the plane of the media facing surface 850. Preferably, the sensors 1204 of the data readers 1202 are more recessed from the plane of the media facing surface 850 than the servo sensors 808, as the servo sensors 808 presented herein are less susceptible to shorting than the data sensors 1204.

The upper shield 804 may be formed using any fabrication technique that would be appreciated by one skilled in the art upon reading the present descriptions. For example, the upper shield 804 may be formed using, e.g., plating, sputtering, etc. Plating techniques may be reserved for films thicker than 0.3 microns according to one approach.

Approaches which include CPP sensors may include an electrical connection to a magnetic lamination or layer proximate to the sensor, to a spacer layer 814, 816 positioned between the sensor structure 808 and one or both magnetic shields 804, 806, and/or to the sensor 808 itself. For example, such approaches may include an electrical lead proximate to the sensor for enabling current flow through the sensor structure. Such leads may be an extension of a layer itself, or a separately-deposited material. Establishing an electrical connection to a magnetic lamination proximate to the sensor and/or to the spacer itself may create a configuration in which portions of the magnetic shields of an apparatus are not biased or current-carrying e.g. the shields are "floating". In such approaches, the nonmagnetic spacer layer 814, 816 included between the sensor structure 808 and the magnetic shields 804, 806 may serve as an electrical lead. These portions may be biased according to various approaches.

The electrical lead layers 810, 812 may or may not be in electrical communication with the associated shield. In approaches where the spacer layers 814, 816 are insulative, various mechanisms for providing current to the sensor may be implemented. Looking to FIG. 8, upper and lower electrical lead layers 810, 812 are in electrical communication with the upper and lower shields 806, 804 respectively, by implementing studs 818, 819 at a location recessed from the media facing surface 850.

Studs 818, 819 preferably include one or more conductive materials, thereby effectively providing an electrical via through insulative spacer layers 814, 816 which allows current to flow between the shields 806, 804 and electrical lead layers 810, 812, respectively. Thus, although insulative spacer layers 814, 816 may separate the shields 806, 804 from the electrical lead layers 810, 812 and sensor 808, the studs 818, 819 allow current to flow from one shield to the other through the sensor. According to an exemplary in-use approach, which is in no way intended to limit the invention, the servo reader transducer structure 802 may achieve this functionality by diverting current from lower shield 804 such that it passes through stud 819 (the stud closest thereto) and into the lower electrical lead 812. The current then travels towards the media facing surface 850 along the lower electrical lead 812, and preferably passes through the tunneling sensor 808 near the media facing surface 850. As will be appreciated by one skilled in the art, the strength of a signal transduced from the magnetic transitions on a magnetic recording medium decreases along the sensor in the height direction (perpendicular to the media facing side). Thus, it is preferred that at least some of the current passes through the sensor 808 near the media facing surface 850, e.g., to ensure high sensor output. According to one approach, this may be accomplished by achieving ideally an approximate equipotential along the length of the sensor 808.

Studs 818, 819 preferably have about the same thickness as upper and lower spacer layers 814, 816 respectively. Moreover, studs 818, 819 are preferably positioned behind or extend past an end of the sensor 808 which is farthest from the media facing surface 850.

The electrically conductive layer(s) preferably have a higher conductivity than the spacer layer. Thus, the spacer layer in some approaches may be electrically insulating or a poor conductor. This helps ensure that a near equipotential is achieved along the length of the sensor. Also and/or alternatively, the resistance of the electrical lead layer along a direction orthogonal to a media facing surface may be less than a resistance across the sensor along a direction parallel to the media facing surface in some approaches. This also helps ensure that a near equipotential is achieved along the length of the sensor. In further approaches, the product of the spacer layer thickness multiplied by the conductivity of the spacer layer is less than a product of the electrical lead layer thickness multiplied by the conductivity of the electrical lead layer associated with the spacer layer, e.g., positioned on the same side of the sensor therewith.

Achieving near equipotential along the length of the sensor 808 results in a relatively more uniform current distribution along the length of the sensor 808 in the height direction. Although equipotential is preferred along the length of the sensor 808, a 20% or less difference in the voltage drop (or loss) across the sensor 808 at the media facing surface 850 compared to the voltage drop across the end of the sensor 808 farthest from the media facing surface 850 may be acceptable, e.g., depending on the desired approach. For example, a voltage drop of 1 V across the sensor 808 at the media facing surface 850 compared to a voltage drop of 0.8 V across the end of the sensor 808 farthest from the media facing surface 850 may be acceptable.

Although the operating voltage may be adjusted in some approaches to compensate for differences in the voltage drop along the length of the sensor 808 of greater than about 10%, it should be noted that the operating voltage is preferably not increased to a value above a threshold value. In other words, increasing the operating voltage above a threshold value is preferably not used to bolster the voltage drop across the sensor 808 at the media facing surface 850 to a desired level (e.g., sensitivity) when a servo reader transducer structure 802 has a drop of greater than about 10%. The threshold value for the operating voltage of a given approach may be predetermined, calculated in real time, be set in response to a request, etc. According to some approaches, the threshold value for the operating voltage may be determined using breakdown voltage(s) of the servo reader transducer structure 802 layers, e.g., based on their material composition, dimensions, etc.

In some approaches, differences in resistivity may also be used to minimize the voltage drop along the length of the sensor 808. In order to ensure that sufficient current passes through the sensor 808 near the media facing surface 850, it is preferred that the resistivity of the sensor 808, as for example due to tunnel barrier resistivity in a TMR, is high relative to the resistivity of the electrical lead layers 810, 812. By creating a difference in the relative resistance of the adjacent layers, low voltage drop may desirably be achieved along the height of the sensor 808.

This relative difference in resistivity values may be achieved by forming the sensor 808 such that it has a relatively high barrier resistivity, while the electrical lead layers 810, 812 may have a higher thickness, thereby resulting in a lower resistance value. It should be noted that the thickness of the electrical lead layers 810, 812 is preferably greater than about 5 nm. The bulk resistivity of a given material typically increases as the dimensions of the material decreases. As will be appreciated by one skilled in the art upon reading the present description, the resistivity of a material having significantly small dimensions may actually be higher than for the same material having larger dimensions, e.g., due to electron surface scattering. Moreover, as the thickness of the electrical lead layers 810, 812 decreases, the resistance thereof increases. Accordingly, the thickness of the upper and/or lower electrical lead layers 810, 812 is preferably between about 2 nm and about 20 nm, more preferably between about 5 nm and about 15 nm, still more preferably less than about 15 nm, but may be higher or lower depending on the desired configuration, e.g., depending on the material composition of the upper and/or lower electrical lead layers 810, 812. Moreover, the thicknesses (in the deposition direction) of the upper and/or lower spacer layers 814, 816 are preferably between about 5 nm and about 50 nm, but may be higher or lower depending on the desired configuration. For example, spacer layers having a relatively hard material composition may be thinner than spacer layers having a material composition which is less hard.

With continued reference to FIG. 8, studs 818, 819 may be implemented during formation of the servo reader transducer structure 802, using processes which would be apparent to one skilled in the art upon reading the present description. According to an example, which is in no way intended to limit the invention, the spacer layer may be formed over a mask (e.g., using sputtering or other forms of deposition), thereby creating a void in the spacer layer upon removal of the mask. Thereafter, the stud may be formed in the void, e.g., using sputtering or plating, after which the stud may be planarized. However, according to another example, a spacer layer may be formed full film, after which a via may be created, e.g., using masking and milling, and filling the via with the stud material, e.g., using ALD, after which the stud may optionally be planarized. Moreover, it should be noted that insulating layer 822 may be thicker than sensor 808, thereby causing upper electrical lead layer 810 and upper spacer layer 814 to extend in the intended tape travel direction 852 before continuing beyond the edge of the sensor 808 farthest from the media facing surface 850, e.g., as a result of manufacturing limitations, as would be appreciated by one skilled in the art upon reading the present description.

Thus, the spacer layers 814, 816 in combination with the studs 818, 819 may provide protection against smearing at the media facing surface 850 while also allowing for the shields 806, 804 to be in electrical communication with the electrical lead layers 810, 812. It follows that one or both of the shields 806, 804 may serve as electrical connections for the servo reader transducer structure 802. According to the present approach, the shields 806, 804 function as the leads for the servo reader transducer structure 802. Moreover, the current which flows towards the media facing surface 850 tends to generate a magnetic field which is canceled out by the magnetic field created by the current which flows away from the media facing surface 850.

However, it should be noted that the approach illustrated in FIG. 8 is in no way intended to limit the invention. Although the electrical lead layers 810, 812 depicted in FIG. 8 are electrically connected to upper and lower shields 806, 804 respectively, in other approaches, one or both of the electrical lead layers 810, 812 may not be electrically connected to the respective shields. According to one example, the upper and lower electrical lead layers may be stitched leads, e.g., see FIG. 10 and FIG. 11, rather than each of the lead layers 810, 812 having a single lead as seen in FIG. 8, as will soon become apparent. Thus, neither of the upper or lower electrical lead layers may be in electrical communication with the shields according to some approaches, as will be described in further detail below.

According to one configuration of apparatus 800, a drive mechanism (not shown) may be implemented for passing a magnetic medium over the sensor 808. In one aspect, a controller may be electrically coupled to the sensor 808 e.g., as described with reference to other FIGS., including FIG. 1A.

Figure 9:
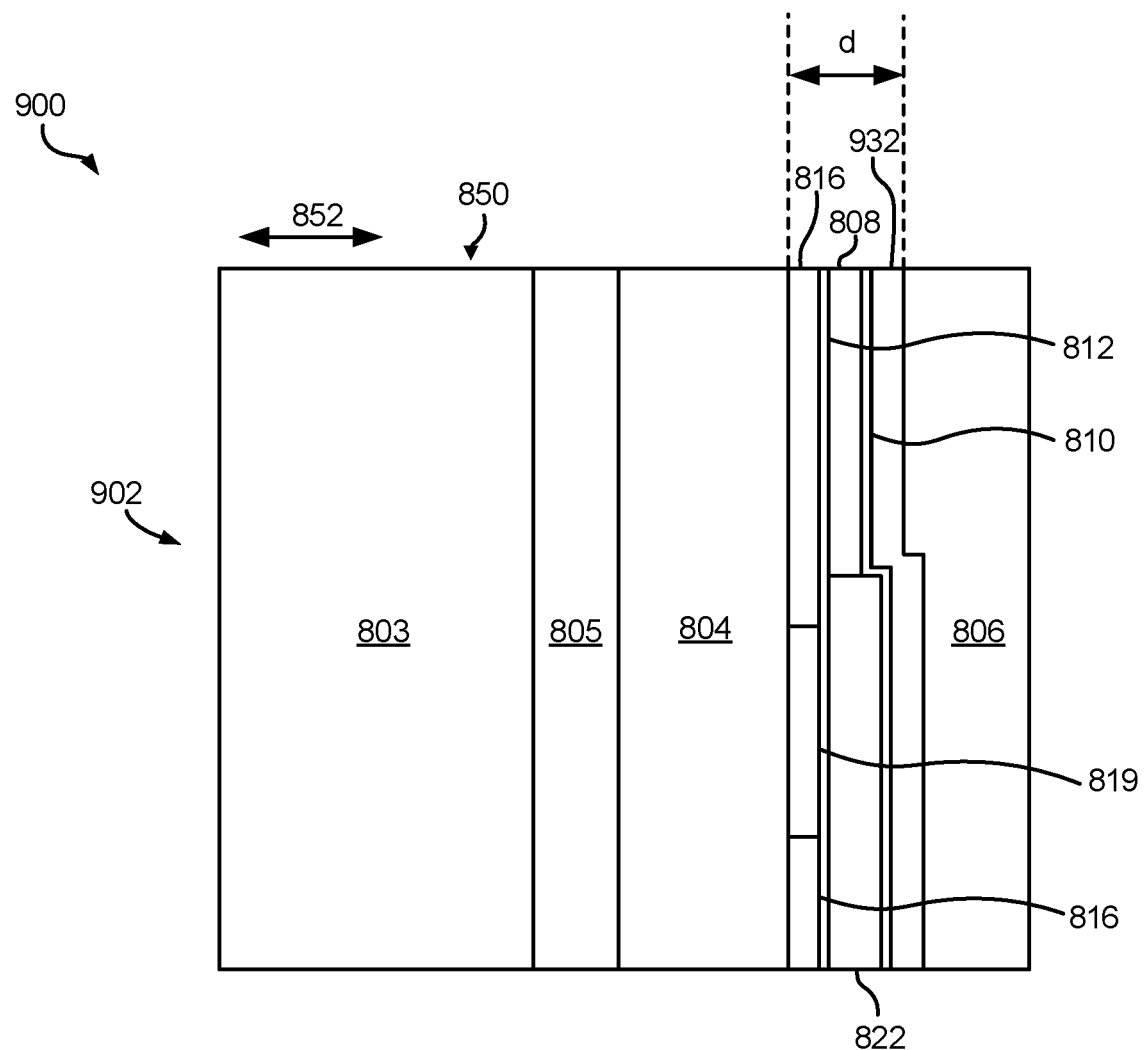
FIG. 9 is a partial cross-sectional view of a servo reader transducer structure according to one approach.

FIG. 9 depicts an apparatus 900, in accordance with one approach. As an option, the present apparatus 900 may be implemented in conjunction with features from any other approach listed herein, such as those described with reference to the other FIGS. However, such apparatus 900 and others presented herein may be used in various applications and/or in permutations which may or may not be specifically described in the illustrative approaches listed herein. Further, the apparatus 900 presented herein may be used in any desired environment. Thus FIG. 9 (and the other FIGS.) may be deemed to include any possible permutation. Various components of FIG. 9 have common numbering with similar components of FIG. 8.

The apparatus 900 includes a servo reader transducer structure 902. According to one aspect of apparatus 900 depicted in FIG. 9, only a single hard spacer layer 816 is present. In this approach, the hard spacer layer 816 is between the sensor 808 and the lower shield 804. A conductive conventional spacer layer 932 is present between the sensor 808 and the upper shield 806.

Figure 10:
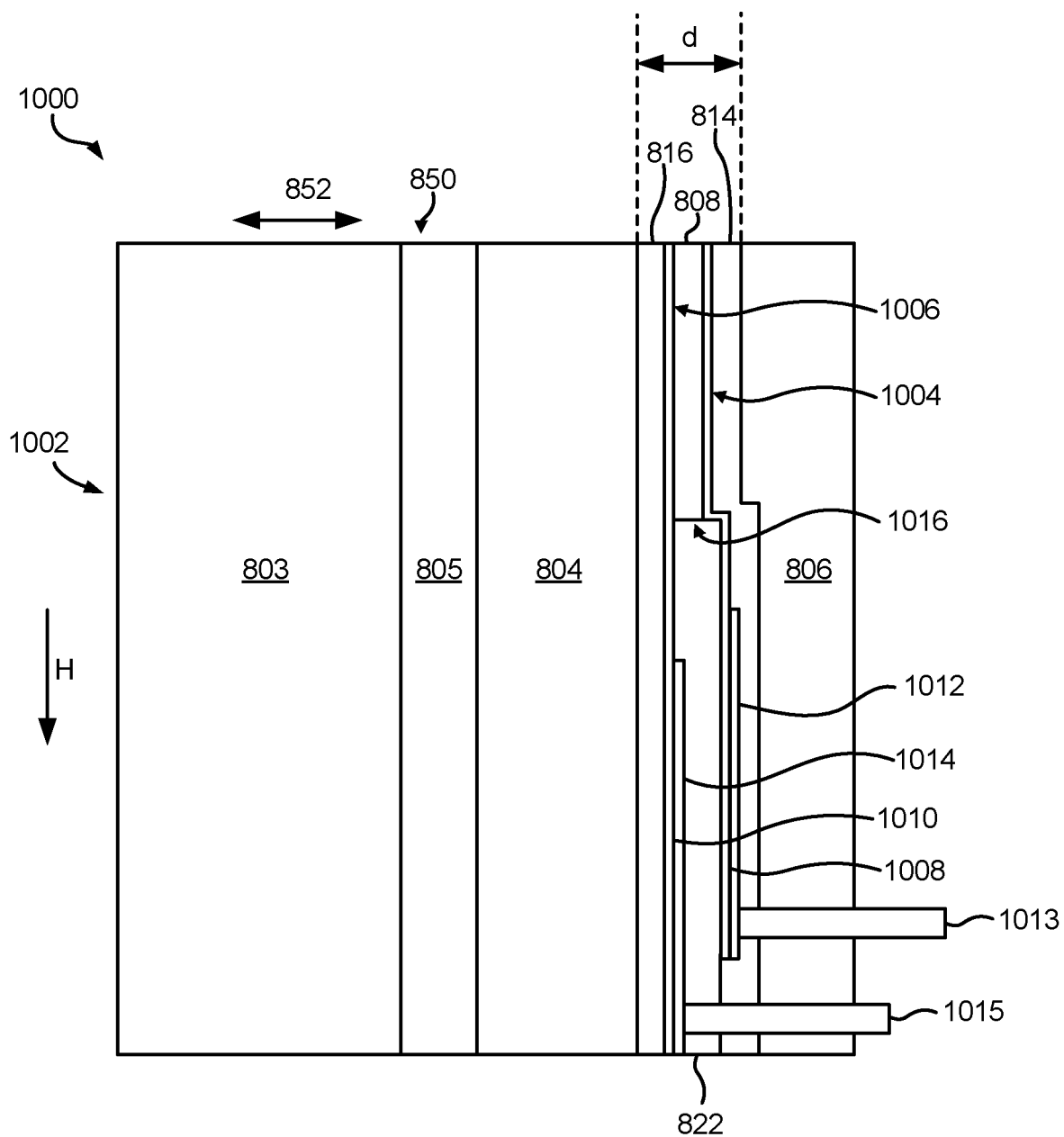
FIG. 10 is a partial cross-sectional view a servo reader transducer structure according to one approach.

Looking to FIG. 10, an apparatus 1000 includes a servo reader transducer structure 1002 in accordance with various approaches. As an option, the present apparatus 1000 may be implemented in conjunction with features from any other configuration listed herein, such as those described with reference to the other FIGS. Specifically, for example, FIG. 10 illustrates variations of the approach of FIG. 8 depicting several exemplary configurations within the servo reader transducer structure 1002. Accordingly, various components of FIG. 10 have common numbering with those of FIG. 8.

However, such apparatus 1000 and others presented herein may be used in various applications and/or in permutations which may or may not be specifically described in the illustrative approaches listed herein. Further, the apparatus 1000 presented herein may be used in any desired environment. Thus FIG. 10 (and the other FIGS.) may be deemed to include any possible permutation.

Looking to FIG. 10, apparatus 1000 includes a servo reader transducer structure 1002 having spacer layers 814, 816 sandwiched between shields 806, 804 and electrical lead layers 1004, 1006 respectively. However, unlike the approach illustrated in FIG. 8, upper and lower electrical lead layers 1004, 1006 of the present approach may not be in electrical communication with either of the shields 806, 804. Rather, when the spacer layers 814, 816 are insulating and fully isolate electrical lead layers 1004, 1006 from upper and lower shields 806, 804 respectfully along the lengths (perpendicular to the media facing surface 850) thereof. Thus, a current (e.g., a read sense current) does not pass through at least one of the upper and lower shields from the CPP sensor 808 and/or electrical lead layers 1004, 1006. In other words, the electrical connection to one or both of the electrical lead layers 1004, 1006 may be independent. As mentioned above, upper and/or lower spacer layers 814, 816 may include at least one of the following materials: ruthenium, ruthenium oxide, aluminum oxide, chrome oxide, silicon nitride, boron nitride, silicon carbide, silicon oxide, titanium oxide, an amorphous aluminum oxide, etc., and/or combinations thereof, and conducting but non-smearing materials such as titanium nitride, conductive ceramics, etc.

According to some approaches, the at least one of the upper and lower shields 806, 804 not having a current (e.g., a read sense current) passing therethrough may be coupled to a bias voltage source. In other words, at least one of the upper and lower shields 806, 804 may be coupled to a bias voltage source. According to other approaches, one or both of the shields may be coupled to an electrical connection (e.g., a lead), but may not carry any current therethrough.

As mentioned above, at least one of the upper and lower electrical lead layers may be a stitched lead. According to the present configuration, which is in no way intended to limit the invention, both electrical lead layers 1004, 1006 are stitched leads which include a main layer 1008, 1010 and a preferably thicker stitch layer 1012, 1014 thereon, respectively. Vias 1013, 1015 may be coupled to a respective electrical lead layer 1004, 1006. The main layers 1008, 1010 may be made during formation of the servo reader transducer structure 1002, while stitch layers 1012, 1014 may be drilled and backfilled after formation of the servo reader transducer structure 1002 using processes and/or in a direction which would be apparent to one skilled in the art upon reading the present description.

As shown, the stitch layers 1012, 1014 are preferably recessed from a media facing side of the main layer 1008, 1010, e.g., the side closes to the media facing surface 850. By stitching a second layer of lead material, e.g. the stitch layer 1012, 1014, which is preferably recessed beyond a back edge 1016 of the sensor 808 in the height direction H, the resistance associated with the electrical lead layers 1004, 1006 may desirably be reduced, e.g., relative to routing either of the leads past a back edge of the respective shield. In various approaches, the main layers 1008, 1010 and/or stitch layers 1012, 1014 of either of the stitched electrical lead layers 1004, 1006 may be constructed of any suitable conductive material, e.g., which may include Ir, Cu, Ru, Pt, NiCr, Au, Ag, Ta, Cr, etc.; a laminated structure of Ta (e.g. Ta/X/Ta); etc.

As mentioned above, the stitched electrical lead layer configuration implemented in servo reader transducer structure 1002 desirably reduces the resistance associated with the routing either of the leads beyond a back edge of the respective shield. For example, in an aspect where Ru is used as the top lead material, the resistivity "ρ" would be about 7.1 micro-ohms/cm. A single lead with thickness of 30 nm would have a sheet resistivity (ρ/thickness) equal to about 2.3 ohms/square. This implies that if the top lead design had 6 "squares" of lead geometry, the lead resistance would be about 13.8 ohms. However, by implementing a stitched layer above the main layer of the stitched electrical lead layer, the total lead resistance would be significantly reduced. For example, consider a stitched lead of Ru with a thickness of 45 nm covering 5 of the 6 "squares" of the lead geometry. The lead region where the stitched structure and the initial lead overlay has a net thickness of about 75 nm and a sheet resistivity equal to 0.95 ohms/square. Implementing a stitched electrical lead layer as described above would reduce the lead resistance to 7.3 ohms or by about 45%. Aspects described herein may or may not implement the stitched electrical lead layers 1004, 1006 (e.g., see FIG. 8), depending on the preferred approach.

In still further approaches, one or more of the electrical lead layers may be an extension of a layer itself, or a separately-deposited material. Establishing an electrical connection to a magnetic lamination proximate to the sensor may create a configuration in which portions of the magnetic shields of an apparatus are not biased or current-carrying. In such approaches, the electrical lead layers included between the sensor structure and the magnetic shield may serve as an electrical lead. Moreover, at least one of the upper and lower shields 806, 804 may be a floating shield, and thereby may not be biased or current-carrying.

Figure 11:
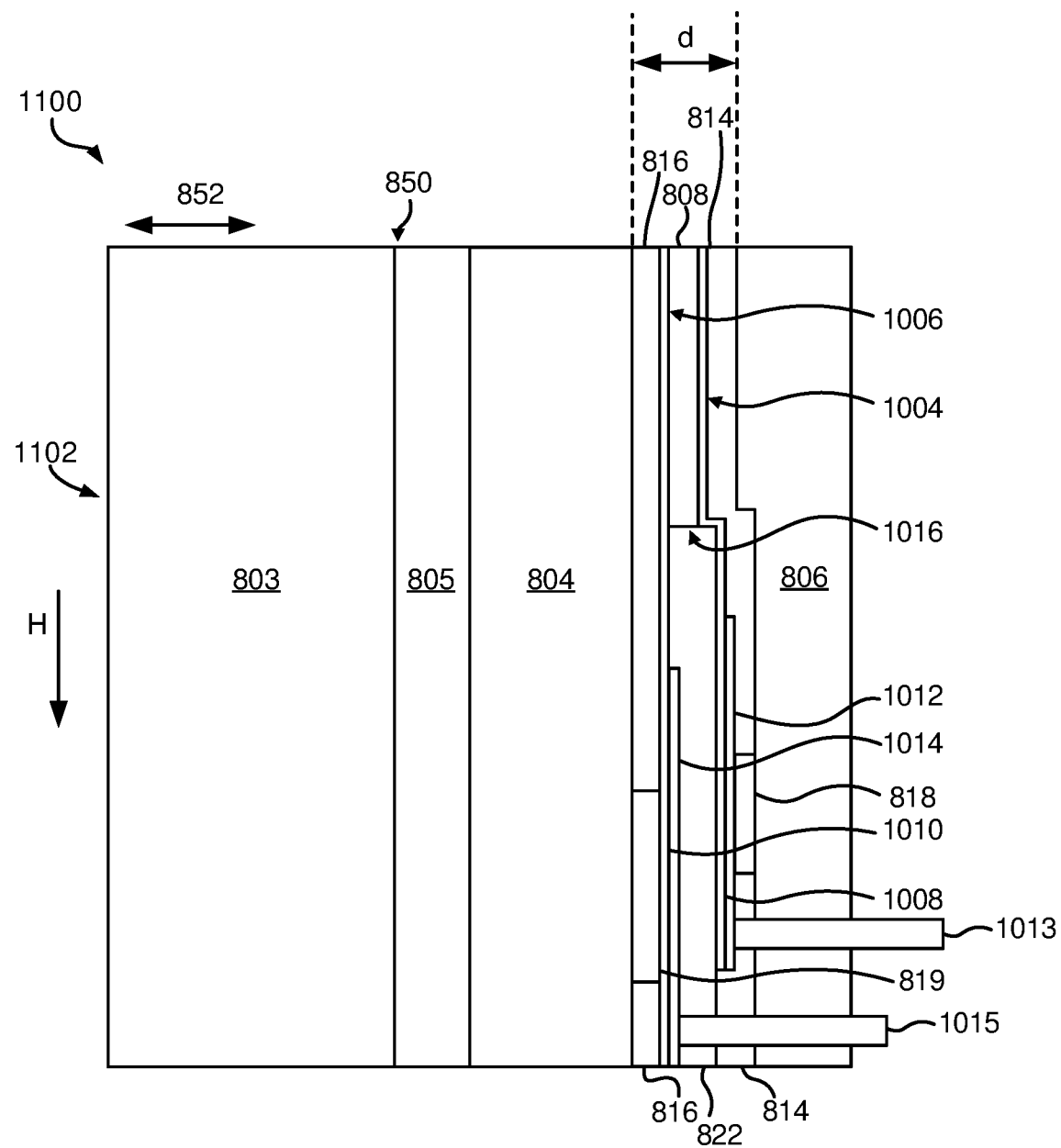
FIG. 11 is a partial cross-sectional view of a servo reader transducer structure according to one approach.

Looking to FIG. 11, an apparatus 1100 is depicted and includes a servo reader transducer structure 1102 in accordance with various approaches. As an option, the present apparatus 1100 may be implemented in conjunction with features from any other approach listed herein, such as those described with reference to the other FIGS. Specifically, for example, FIG. 11 illustrates variations of the configuration of FIG. 8 depicting several exemplary configurations within the servo reader transducer structure 1002. Accordingly, various components of FIG. 11 have common numbering with those of FIG. 8.

However, such apparatus 1100 and others presented herein may be used in various applications and/or in permutations which may or may not be specifically described in the illustrative approaches listed herein. Further, the apparatus 1100 presented herein may be used in any desired environment. Thus FIG. 11 (and the other FIGS.) may be deemed to include any possible permutation.

FIG. 11 depicts an apparatus 1100 which includes vias 1013, 1015 like those of FIG. 10, and studs 818, 819 like those in FIG. 8. The studs 818, 819 are not current carrying and therefore preferably have a relatively high resistance compared to the current-carrying portions of the head.

According to an exemplary in-use approach, which is in no way intended to limit the invention, the servo reader transducer structure 1102 may achieve this functionality by diverting current from lower shield 804 such that it passes through stud 819 (the stud closest thereto, as described in FIG. 8) and into the via 1015 coupled to the lower electrical lead layer 1006 (e.g. as described in FIG. 10). The current then travels towards the media facing surface 850 along the lower electrical lead 1006, and preferably passes through the tunneling sensor 808 near the media facing surface 850. As will be appreciated by one skilled in the art, the strength of a signal transduced from the magnetic transitions on a magnetic recording medium decreases along the sensor in the height direction (perpendicular to the media facing side). Thus, it is preferred that at least some of the current passes through the sensor 808 near the media facing surface 850, e.g., to ensure high sensor output. According to one approach, this may be accomplished by achieving ideally an approximate equipotential along the length of the sensor 808.

Various approaches described herein are able to provide bi-directional protection for CPP transducers against shorting which may otherwise result from passing magnetic media over such transducers. Implementing a spacer layer having a high resistivity to smearing and/or plowing between the CPP servo reader transducer layer and each of the conducting lead portions of the transducer stack without hindering the flow of current through the sensor enables the approaches herein to maintain desirable performance over time. Moreover, as previously mentioned, although it is preferred that a spacer layer is included on either side of a sensor along the intended direction of tape travel, some of the approaches described herein may only include one spacer layer positioned between one of the leads or sensor and the shield closest thereto, such that the at least one lead is electrically isolated from the shield closest thereto.

Various configurations may be fabricated using known manufacturing techniques. Conventional materials may be used for the various layers unless otherwise specifically foreclosed. Furthermore, as described above, deposition thicknesses, configurations, etc. may vary depending on the approach.

It should be noted that although FIGS. 8-9 each illustrate a single servo reader transducer structure (servo reader transducer structures 802, 902, 1002, 1102), various approaches described herein include more than one servo reader transducer structures above a common substrate, e.g., as shown in FIG. 2B. Furthermore, the number of servo reader transducer structures in a given array may vary depending on the preferred approach.

In various approaches, a module e.g., as shown in any of FIGS. 2-7 may include a servo reader transducer structure according to any approach described herein, and may further include an array of writers thereon, an array of data readers thereon, or arrays of data readers and writers thereon. The readers and/or writers may be of any type known in the art, and may be configured and/or arranged according to descriptions of writers described elsewhere herein and/or in other FIGS.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer.

The inventive concepts disclosed herein have been presented by way of example to illustrate the myriad features thereof in a plurality of illustrative scenarios, approaches, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various approaches have been described above, it should be understood that they have been presented by way of example only, and not limitation. Thus, the breadth and scope of an approach of the present invention should not be limited by any of the above-described exemplary approaches, but should be defined only in accordance with the following claims and their equivalents.

What is claimed is:

1. An apparatus, comprising:
a servo reader transducer structure on a module, the servo reader transducer structure having:
a lower shield;
an upper shield above the lower shield, the upper and lower shields providing magnetic shielding, wherein a distance between the shields is at least 300 nm;
a current-perpendicular-to-plane sensor between the upper and lower shields;
a first electrical lead layer between the sensor and one of the shields, wherein the electrical lead layer is in electrical communication with the sensor;
a first spacer layer between the electrical lead layer and the one of the shields,
wherein a conductivity of the electrical lead layer is higher than a conductivity of the spacer layer; and
an array of data readers on the module adjacent the servo reader transducer structure,
wherein the current-perpendicular-to-plane sensor is recessed from a plane of a media facing surface of the module, and sensors of the data readers are more recessed from the plane of the media facing surface of the module than the current-perpendicular-to-plane sensor of the servo reader transducer structure.

2. An apparatus as recited in claim 1, wherein the first electrical lead layer is present between the current-perpendicular-to-plane sensor and the upper shield, and further comprising a second electrical lead layer, wherein the second electrical lead layer is present between the current-perpendicular-to-plane sensor and the lower shield, wherein the first spacer layer is present between the upper shield and the first electrical lead layer, wherein a second spacer layer is present between the lower shield and the second electrical lead layer.

3. An apparatus as recited in claim 1, wherein the spacer layer includes at least one material selected from the group consisting of: ruthenium, ruthenium oxide, aluminum oxide, chrome oxide, silicon nitride, boron nitride, silicon carbide, silicon oxide, titanium oxide, and titanium nitride.

4. An apparatus as recited in claim 3, wherein the spacer layer includes amorphous aluminum oxide.

5. An apparatus as recited in claim 3, wherein the spacer layer includes at least partially polycrystalline aluminum oxide.

6. An apparatus as recited in claim 3, wherein the spacer layer includes aluminum oxide having a deposition thickness of about 100 nm to about 150 nm.

7. An apparatus as recited in claim 1, wherein the electrical lead layer includes a main layer and a stitch layer thereon, the stitch layer being recessed from a media facing side of the main layer.

8. An apparatus as recited in claim 1, wherein a resistance of the electrical lead layer along a direction orthogonal to the media facing surface of the module is less than a resistance across the current-perpendicular-to-plane sensor along a direction parallel to the media facing surface of the module.

9. An apparatus as recited in claim 1, wherein the spacer layer is electrically insulating.

10. An apparatus as recited in claim 1, wherein the electrical lead layer is in electrical communication with the one of the shields.

11. An apparatus as recited in claim 1, wherein the electrical lead layer is not in electrical communication with the one of the shields.

12. An apparatus as recited in claim 1, wherein the current-perpendicular-to-plane sensor is a tunneling magnetoresistive servo sensor.

13. An apparatus as recited in claim 1, wherein the electrical lead layer comprises iridium.

14. An apparatus as recited in claim 13, wherein a total deposition thickness of the iridium is in a range of about 10 nm to about 75 nm.

15. An apparatus as recited in claim 1, comprising a seed layer for the electrical lead layer, the seed layer comprising chromium.

16. An apparatus as recited in claim 1, wherein a distance between the shields is in a range of about 300 nm to about 500 nm.

17. An apparatus as recited in claim 1, wherein a recession of the current-perpendicular-to-plane sensor from the plane of the media facing surface of the module is about 5 nm to about 1 nm.

18. An apparatus as recited in claim 1, comprising:
a drive mechanism for passing a magnetic medium over the module; and
a controller electrically coupled to the module.

* * * * *